(12) United States Patent
Kuramoto et al.

(10) Patent No.: US 10,908,525 B2
(45) Date of Patent: Feb. 2, 2021

(54) BEARING COMPONENT, ROTATING DEVICE USING THE SAME, AND IMAGE FORMING APPARATUS

(71) Applicant: FUJI XEROX CO., LTD., Tokyo (JP)

(72) Inventors: Kazuki Kuramoto, Kanagawa (JP); Keiichiro Sato, Kanagawa (JP); Shuhei Yamazaki, Kanagawa (JP); Hirofumi Hamada, Kanagawa (JP); Toru Morioka, Kanagawa (JP)

(73) Assignee: FUJI XEROX CO.. LTD., Tokyo (JP)

( * ) Notice: Subject to any disclaimer, the term of this patent is extended or adjusted under 35 U.S.C. 154(b) by 0 days.

(21) Appl. No.: 16/723,826

(22) Filed: Dec. 20, 2019

(65) Prior Publication Data
US 2020/0319572 A1 Oct. 8, 2020

(30) Foreign Application Priority Data
Apr. 3, 2019 (JP) .................................. 2019-071021

(51) Int. Cl.
*G03G 15/02* (2006.01)
*F16C 17/00* (2006.01)
(Continued)

(52) U.S. Cl.
CPC ......... *G03G 15/0233* (2013.01); *F16C 17/04* (2013.01); *F16C 17/08* (2013.01); *G03G 15/0225* (2013.01); *F16C 2324/16* (2013.01)

(58) Field of Classification Search
CPC ............ G03G 15/0233; G03G 15/0225; F16C 17/02; F16C 17/04; F16C 17/10; F16C 35/02; F16C 2324/16; F16C 17/08
(Continued)

(56) References Cited

U.S. PATENT DOCUMENTS 7,369,797 B2 * 5/2008 Yoshida ............. G03G 15/0893
399/119
2013/0147295 A1 * 6/2013 Shimizu .................. H02K 7/081
310/90

(Continued)

FOREIGN PATENT DOCUMENTS

DE        4116513 A1 * 12/1991 .............. B41F 13/20
JP      62124315 A  *  6/1987
(Continued)

*Primary Examiner* — Robert B Beatty
(74) *Attorney, Agent, or Firm* — Sughrue Mion, PLLC

(57) ABSTRACT

A bearing component for rotatably receiving a rotating shaft on an end of a rotating unit includes a component body, an inner protrusion, and one or more outer protrusions. The component body has a recess into which the rotating shaft is rotatably inserted. The inner protrusion protrudes from a wall portion of the recess facing an end surface of the rotating shaft. The inner protrusion receives an axial load by the rotating shaft. The outer protrusions protrude from an outer surface of the component body opposite to the recess. The one or more outer protrusions are in contact with a holding unit. A contact portion between the outer protrusions and the holding unit is offset from a contact portion position between the inner protrusion and the end surface. The contact portion between at least one of the outer protrusions and the holding unit has a non-planar shape.

20 Claims, 22 Drawing Sheets

(51) Int. Cl.
*F16C 17/08* (2006.01)
*F16C 17/04* (2006.01)

(58) Field of Classification Search
USPC .................................................. 399/115, 176
See application file for complete search history.

(56) References Cited

U.S. PATENT DOCUMENTS

2013/0251393 A1* 9/2013 Yamaguchi ........ G03G 15/0225
399/100
2018/0259901 A1* 9/2018 Makita ............... G03G 15/0806

FOREIGN PATENT DOCUMENTS

| JP | 2002235737 A | * | 8/2002 |
| JP | 2016-109898 A | | 6/2016 |
| JP | 2017-146472 A | | 8/2017 |
| JP | 2018013565 A | * | 1/2018 |
| WO | 2017/142099 A1 | | 8/2017 |

* cited by examiner

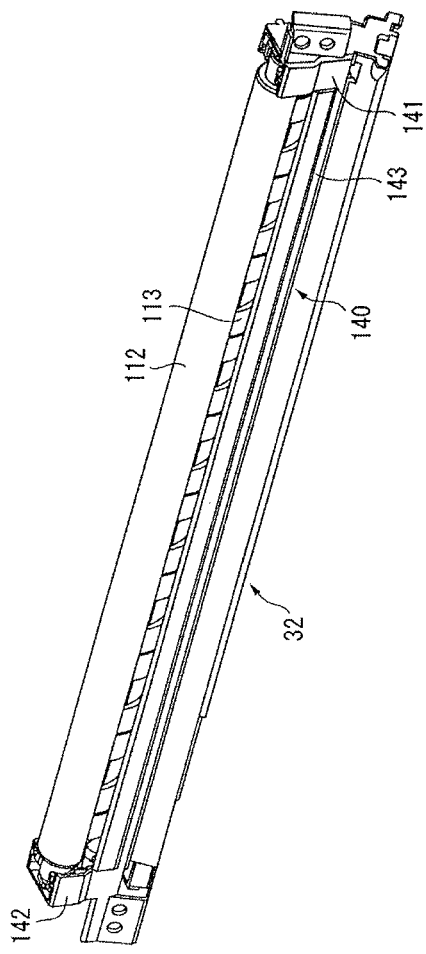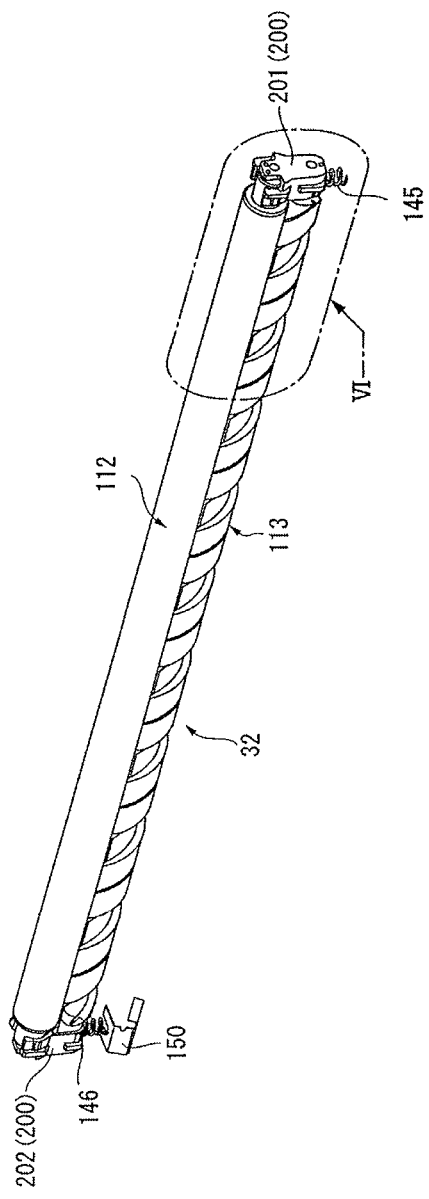
FIG.5A
FIG.5B

BEARING COMPONENT, ROTATING DEVICE USING THE SAME, AND IMAGE FORMING APPARATUS

CROSS-REFERENCE TO RELATED APPLICATIONS

This application is based on and claims priority under 35 USC 119 from Japanese Patent Application No. 2019-071021 filed Apr. 3, 2019.

BACKGROUND

(i) Technical Field

The present disclosure relates to a bearing component, a rotating device using the same, and an image forming apparatus.

(ii) Related Art

JP-A-2017-146472 and JP-A-2016-109898 describe image forming apparatuses and charging devices mounted in the image forming apparatuses.

JP-A-2017-146472 aims to improve the followability of rotation of a roller with respect to a photoconductor, and discloses an image forming apparatus including a support target unit which is provided on the inner peripheral surface of a cylindrical bore extending in the direction of the rotation axis of a roller on either end of a metal core shaft about the rotation axis and which is rotatably supported by a roller support unit.

JP-A-2016-109898 discloses a charging device including a charging roller having a conductive shaft portion on an end thereof and a bearing member having multiple arc-shaped convex portions formed as a support unit that supports the end within an angular range smaller than 180 degrees in the circumferential direction in a cross-section crossing the axial direction, the support unit being formed inside the end surface of the shaft portion in the axial direction, in order to improve the slidability of the charging roller and the bearing member and suppress generation of noise due to sliding.

SUMMARY

Aspects of non-limiting embodiments of the present disclosure relates to (i) a bearing component which is prevented from coming into single-side contact with a rotating shaft of a rotating unit due to an axial load exerted on the rotating shaft with a simplified configuration, (ii) a rotating device using the bearing component, and (iii) an image forming apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a bearing component for rotatably receiving a rotating shaft located on an end of a rotating unit, the bearing component including: a component body having a recess into which the rotating shaft is rotatably inserted; an inner protrusion that protrudes from a wall portion of the recess facing an end surface of the rotating shaft, the inner protrusion being configured to receive an axial load exerted by the rotating shaft with being in contact with the end surface of the rotating shaft; and one or more outer protrusions that protrude from an outer surface of the component body opposite to the recess, the one or more outer protrusions being configured to come into contact with a holding unit configured to hold the component body, in which a contact portion between the one or more outer protrusions and the holding unit is offset from a contact portion position between the inner protrusion and the end surface of the rotating shaft, and at least one of the one or more outer protrusions on the outer surface of the component body is formed such that the contact portion between the at least one of the one or more outer protrusions and the holding unit has a non-planar shape, and the component body includes a portion to be held to be in contact with the holding unit in an area that is opposite to the at least one of the one or more outer protrusions and that includes the contact portion position of the inner protrusion.

BRIEF DESCRIPTION OF THE DRAWINGS

Exemplary embodiment(s) of the present disclosure will be described in detail based on the following figures, wherein:

FIG. 5A is a view illustrating a charging device mounted in the photoconductor cartridge;

FIG. 5B is a view illustrating a state where a charging container is removed from the charging device illustrated in FIG. 5A;

DETAILED DESCRIPTION

Outline of Exemplary Embodiment

Figure 1A:
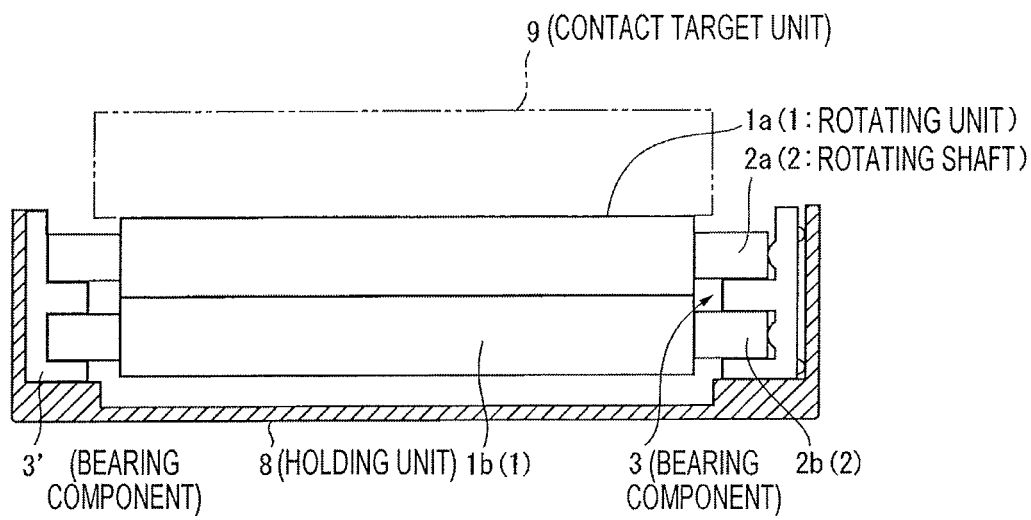
FIG. 1A is a view illustrating an outline of an exemplary embodiment of an image forming apparatus using a rotating device including a bearing component to which the present disclosure is applied.
Figure 1B:
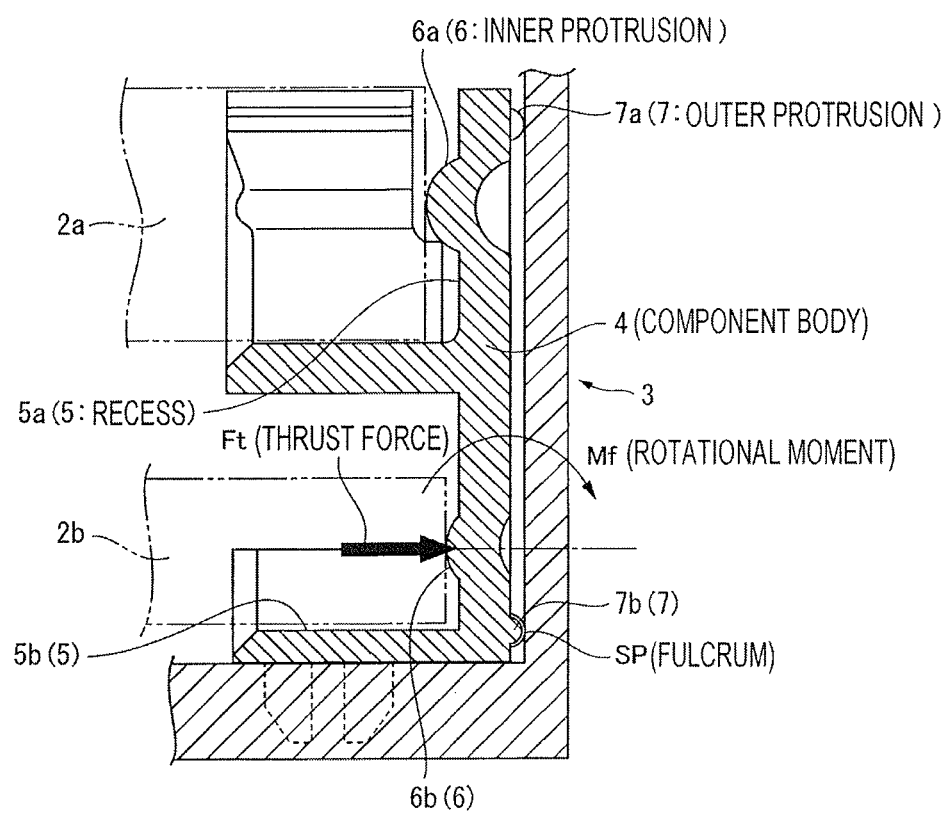
FIG. 1B is a view illustrating a major portion of the bearing component illustrated in FIG. 1A.

FIG. 1A is a view illustrating an example of an image forming apparatus using a rotating device including a bearing component to which the present disclosure is applied. FIG. 1B is a view illustrating a major portion of the bearing component.

In FIGS. 1A and 1B, the bearing component 3 rotatably receives a rotating shaft 2 located on an end of a rotating unit 1, and includes a component body 4 having a recess 5 into which the rotating shaft 2 is rotatably inserted, an inner protrusion 6 protruding from a wall portion of the recess 5 facing the end surface of the rotating shaft 2 and receiving an axial load exerted by the rotating shaft 2 with being in contact with the end surface of the rotating shaft 2, and one or more outer protrusions 7 protruding from an outer surface of the component body 4 opposite to the recess 5 and coming into contact with a holding unit 8 which holds the component body 4. A contact portion between the outer protrusions 7 and the holding unit 8 is offset from a contact portion position between the inner protrusion 6 and the end surface of the rotating shaft 2, and at least one of the one or more outer protrusions 7 (for example, 7b) on the outer surface of the component body 4 is formed such that the contact portion with the holding unit 8 has a non-planar shape. The component body 4 has a portion that is held to be in contact with the holding unit 8 in an area that is opposite to the outer protrusion 7 and that includes the contact portion position of the inner protrusion 6.

In particular, the bearing component 3 illustrated in FIG. 1A is applied in an aspect in which the bearing component 3 rotatably receives multiple rotating shafts 2 (2a and 2b in FIGS. 1A and 1B) located on the ends of multiple rotating units 1 (1a and 1b in FIG. 1A). This example illustrates a configuration example of the bearing component 3 on the side of the rotating shaft 2 of the rotating unit 1 which receives the axial load, and that a bearing component 3' which rotatably receives the opposite side of the rotating shaft 2 may have the same configuration as the bearing component 3 or may use a configuration of the related art.

In such a technical unit, the rotating shafts 2 may include not only a rotating shaft having the same diameter as the rotating unit 1 but also a rotating shaft having a diameter different from that of the rotating unit 1.

Here, the number of recesses 5 in the component body 4 is not limited to one, but may be two or more. In this example, the component body 4 has multiple recesses 5 (5a and 5b in FIGS. 1A and 1B). In addition to this, as an aspect of the component body 4, there is also an aspect in which the component body receives multiple components including the rotating shaft 2 and the rotating unit 1 as separate components to attach one component to the other component.

Further, the shapes of the inner protrusion 6 and the outer protrusion 7 are not limited, but the location at which the inner protrusion 6 is provided is the wall portion of the recess 5 facing the end surface of the rotating shaft 2 and the location at which the outer protrusion 7 is provided is the outer surface of the component body 4 opposite to the recess 5.

Furthermore, the holding unit 8 which holds the component body 4 refers to a case in which the rotating unit 1 is accommodated or a holding member attached to the case.

In this example, with regard to a positional relationship between the outer protrusion 7 and the inner protrusion 6, the contact portion between the outer protrusions 7 and the holding unit 8 needs to be offset from the contact portion position between the inner protrusion 6 and the end surface of the rotating shaft 2. Although the shape of the contact portion is not limited to a point shape but includes a planar shape, for example, when a pair of outer protrusions is configured in a planar shape having a large contact area with the contact portion position of the inner protrusion portion 6 interposed therebetween, even if the axial load (thrust force) is applied to the inner protrusion 6, the thrust force is received by the pair of planar outer protrusions, but a moment due to the thrust force is not generated and the posture of the component body 4 with respect to the holding unit 8 may become unstable. For this reason, in this example, in order to generate the moment due to the thrust force, the contact portion by at least one of the one or more outer protrusions 7 needs to have a non-planar shape. The "non-planar shape" mentioned here includes not only a hemispherical shape but also a cylinder or cylindrical shape.

Further, the component body 4 may have a portion that is held to be in contact with the holding unit 8 in an area that is opposite to the non-planar outer protrusion 7 (for example, 7b) and that includes the contact portion position of the inner protrusion 6 (for example, 6b). The "portion that is held to be in contact with" mentioned here includes not only the outer protrusion 7 but also the component body 4. For example, when the holding unit 8 has a stepped portion or a positioning recess, a corner portion of the component body 4 may be brought into direct contact with the stepped portion or the positioning recess. In other words, in this example, one of the outer protrusions 7 (for example, 7b) may act as a fulcrum SP which is the center of application of the moment due to the thrust force, and the other outer protrusion 7 (for example, 7a) or a portion of the component body 4 may act as a holding point that comes into contact with the holding unit 8 in the opposite area including the contact portion position of the inner protrusion 6.

According to the bearing component 3 having the configuration described above, when the rotating shaft 2 of the rotating unit 1 tries to move toward one axial direction, the end surface of the rotating shaft 2 comes into contact with the inner protrusion 6 in the recess 5 of the component body 4 and a thrust force Ft which is the axial load exerted from the rotating shaft 2 is applied to the inner protrusion 6. In this state, a rotational moment Mf is applied to the component body 4 with one of the outer protrusions 7 offset from the point of application of the thrust force Ft as the fulcrum SP. The component body 4 is pressed toward the holding unit 8 about the fulcrum SP, and the component body 4, the one or more outer protrusions 7 or a portion of the component body 4 (for example, a peripheral edge) is held to be in contact with the holding unit 8. As a result, a situation in which the bearing component 3 falls down in the direction of lifting from the holding unit 8 is suppressed.

For this reason, for example, generation of noise due to single-side contact between the rotating shaft 2 of the rotating unit 1 and the bearing component 3 may be suppressed, or, in an image forming apparatus including a rotating device to be described below, adverse effects caused by poor contact between the rotating unit 1 and a contact target unit 9 (for example, poor image quality due to a charging failure) may be suppressed.

Further, when the bearing component 3 according to the present exemplary embodiment is grasped from the operational viewpoint thereof, as illustrated in FIGS. 1A and 1B, there may be understood an aspect in which the bearing component 3 which rotatably receives the rotating shafts 2 (2a and 2b in this example) located on the ends of the rotating units 1 (1a and 1b in this example) includes the component body 4 having the recesses 5 (5a and 5b in this example) into which the rotating shafts 2 are rotatably inserted, the inner protrusions 6 (6a and 6b in this example) protruding from the wall portion of the recesses 5 facing the end surfaces of the rotating shafts 2 and receiving the axial load exerted by the rotating shafts 2 with being in contact with the end surfaces of the rotating shafts 2, and one or more outer protrusions 7 (7a and 7b in this example) protruding from the outer surface of the component body 4 opposite to the recesses 5 and come into contact with the holding unit 8 which holds the component body 4, the contact portion between the outer protrusions 7 and the holding unit 8 is offset from the line of force of the axial load exerted by the rotating shaft 2 on the inner protrusions 6, and at least one of the one or more outer protrusions 7 (7b in this example) acts as the fulcrum SP at which the rotational moment Mf due to the axial load exerted by the rotating shafts 2 (corresponding to the thrust force Ft) is applied to maintain the posture of the component body 4 with respect to the holding unit 8.

In this example, since the outer protrusion 7 is offset from the position of the inner protrusion 6, when the axial load (thrust force Ft) exerted from the rotating shaft 2 of the rotating unit 1 is applied to the inner protrusion 6, the rotational moment Mf is applied to the component body 4 with the outer protrusion 7 (7b in this example) in contact with the holding unit 8 as the fulcrum SP. At this time, the component body 4 tends to fall down due to the applied rotational moment Mf, but the direction in which the rotational moment Mf is applied may be appropriately selected as long as the posture of the component body 4 with respect to the holding unit 8 is maintained.

Next, a representative aspect or an exemplary aspect of the bearing component 3 according to the present exemplary embodiment will be described.

First, as an exemplary aspect of the outer protrusions 7, a portion of each outer protrusion 7 in contact with the holding unit 8 has a curved surface. In this example, the shape of a protruding end of the outer protrusion 7 is devised. When the portion of the outer protrusion in contact with the holding unit 8 has a curved surface, the contact portion with the holding unit 8 may be more similar to a point shape and a contact area thereof may be reduced. When the rotational moment Mf is applied to the component body 4 about the fulcrum SP, the posture of the component body 4 with respect to the holding unit 8 may be easily changed and the component body 4 may be supported at three points with respect to the holding unit 8 such that the posture of the component body 4 is stably maintained.

Furthermore, as an exemplary aspect of the inner protrusion 6, a portion of the inner protrusion 6 in contact with the end surface of the rotating shaft 2 of the rotating unit 1 has a curved surface. In this example, the shape of a protruding end of the inner protrusion 6 is devised. When the portion of the inner protrusion in contact with the end surface of the rotating shaft 2 has a curved surface, the contact portion with the end surface of the rotating shaft 2 may be more similar to a point shape, a contact area thereof may be reduced, and the thrust force Ft which is the axial load exerted from the rotating shaft 2 may be intensively applied to the portion.

Further, in the present exemplary embodiment, the bearing component 3 includes the multiple recesses 5 (5a and 5b in this example) in order to rotatably receive the rotating shafts 2 (2a and 2b in this example) located on the ends of the multiple rotating units 1 (1a and 1b in this example).

In this example, an arrangement relationship of the outer protrusions 7 (7a and 7b in this example) with respect to the inner protrusion 6 (6b in this example) inside the recess 5 (5b in this example) to which the thrust force Ft which is the axial load exerted by the rotating shaft 2 is applied may be satisfied.

In this example, with respect to an aspect in which, even if the multiple recesses 5 (5a and 5b) support the multiple rotating shafts 2 (2a and 2b), the thrust force Ft which is the axial load exerted by the rotating shaft 2 of the rotating unit 1 is not easily applied to the inner protrusion 6 in the recess 5, the arrangement relationship of the outer protrusions 7 (7a and 7b) with respect to this type of inner protrusion 6 (for example, 6a) does not need to be satisfied, and a predetermined arrangement relationship of the outer protrusions 7 (7a and 7b) with respect to the inner protrusion 6 (for example, 6b) according to an aspect in which the thrust force Ft which is the axial load exerted by the rotating shaft 2 is biased to one side in the axial direction may be satisfied.

Furthermore, as an exemplary aspect in which the multiple recesses 5 (5a and 5b) are provided, the number of outer protrusion 7 is larger than the number of inner protrusions 6. This example indicates an aspect in which three or more outer protrusions 7 are provided when there are two inner protrusions 6, but is exemplary from the viewpoint in which the bearing component 3 is stably held with respect to the holding unit 8 via multiple holding points.

Further, as another exemplary aspect in which the multiple recesses 5 (5a and 5b) are provided, multiple outer protrusions 7 are provided, and the rotational moment Mf due to the thrust force Ft which is the axial load exerted by the rotating shaft 2 on the inner protrusion 6 in the recess 5 is applied in different directions. This example is exemplary to more reliably suppress the component body 4 from falling down since the rotational moment Mf is applied to the respective recesses 5 (5a and 5b) in directions crossing each other.

Next, an example in which the bearing component 3 according to the present exemplary embodiment is applied to a rotating device will be described.

There may be an aspect in which this type of rotating device includes the rotating unit 1 having the rotating shaft 2 on the end thereof, the bearing component 3 which rotatably receives the rotating shaft 2 of the rotating unit 1, and the holding unit 8 which holds the bearing component 3.

As illustrated in FIG. 1A, examples of the rotating device include the rotating unit 1 that is configured as a charging unit that charges the contact target unit 9 with being into contact with the contact target unit 9. That is, FIG. 1A illustrates an application example of the rotating device to the charging device.

In this case, the bearing component 3 may be configured such that a power supply element (not illustrated) is added to the component body 4. This example is an aspect in which the power supply element is added to the bearing component 3 to enable the supply of power to a charging unit.

Further, as an application example to the rotating device, there may be an aspect in which the rotating unit 1 comes into contact with the contact target unit 9 that is driven and rotated, and rotates following the contact target unit 9. This example is effective to suppress single-side contact because there is a high probability that the thrust force may be applied to the rotating unit 1 which rotates following the contact target unit 9.

Furthermore, an example in which the rotating device according to the present exemplary embodiment is applied to an image forming apparatus will be described.

As an example of such an image forming apparatus, there may be an aspect in which the image forming apparatus includes an image carrier which carries an image and the rotating device including the rotating unit 1 disposed in contact with the image carrier. A target of this example is the rotating device in which the image carrier is the contact target unit 9.

As a representative aspect of this type of image forming apparatus, there may be an aspect in which the rotating device is a charging device which charges the image carrier (corresponding to the contact target unit 9), and includes a charging unit (corresponding to the rotating unit 1a) which comes into contact with the image carrier and rotates following the image carrier to charge the image carrier and a cleaning unit (corresponding to the rotating unit 1b) which comes into contact with the charging unit and rotates following the charging unit to clean the charging unit, and the cleaning unit includes a cleaning member spirally provided around the rotating shaft 2 (for example, 2b) and is movable in one axial direction when rotating following rotation of the charging unit. In an aspect of this example in which the charging device as the rotating device includes the charging unit and the cleaning unit and the cleaning unit includes the cleaning member spirally provided around the rotating shaft 2, the cleaning unit moves in one axial direction depending on a rotational direction when the cleaning unit rotates following the charging unit. For this reason, a phenomenon in which the thrust force Ft which is the axial load is exerted on the bearing component 3 which supports the cleaning unit may easily occur.

The reason why such a thrust force Ft is likely to occur depends on a configuration of the cleaning unit (corresponding to the rotating unit 1b) as described above, but is not necessarily limited thereto. For example, a configuration in which a biasing force is applied by a biasing unit so as to generate the thrust force Ft in one axial direction with respect to the rotating shaft 2 of the rotating unit 1 may be appropriately selected.

Hereinafter, the present disclosure will be described in more detail based on exemplary embodiments illustrated in the accompanying drawings.

First Exemplary Embodiment

Overall Configuration of Image Forming Apparatus

Figure 2:
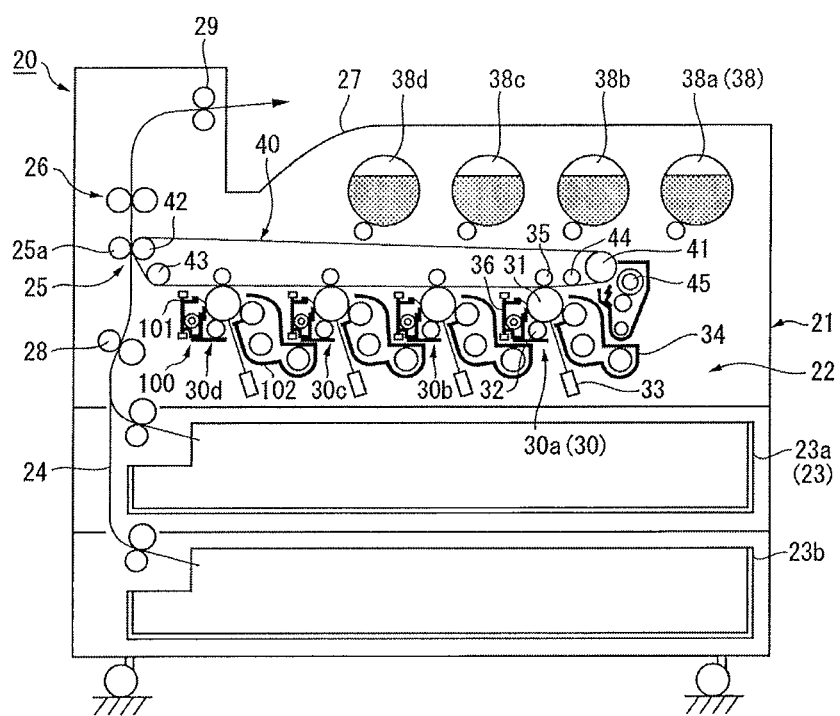
FIG. 2 is a view illustrating an overall configuration of an image forming apparatus according to a first exemplary embodiment.

FIG. 2 illustrates an overall configuration of an image forming apparatus according to a first exemplary embodiment.

In FIG. 2, an image forming apparatus 20 includes an image forming engine 22 for forming, for example, an image of multiple color components which is in an apparatus case 21. A paper supply container 23 (in this example, two-stage paper supply containers 23a and 23b) for supplying paper is disposed below the image forming engine 22, and the paper supplied from the paper supply container 23 is transported through a paper transport path 24 extending in a substantially vertical direction. After the image formed by the image forming engine 22 is transferred by a batch transfer device 25, the image transferred onto the paper is fixed by a fixing device 26, and the paper to which the image has been completely fixed is discharged, for example, to a paper discharge receptacle 27 provided above the apparatus case 21.

Image Forming Engine

In this example, the image forming engine 22 includes multiple image forming units 30 (specifically, 30a to 30d) using toners of multiple color components (in this example, Y (yellow), M (magenta), C (cyan), and K (black)) which adopt an electrophotographic method. After respective color component images formed by the respective image forming units 30 are primarily transferred onto an intermediate transfer body 40, the images on the intermediate transfer body 40 are collectively transferred (secondarily transferred) onto the paper by the batch transfer device 25.

In this example, each of the image forming units 30 (30a to 30d) includes, for example, a drum-shaped photoconductor 31, and a charging device 32 which charges the photoconductor 31, a latent image writing device 33 which forms an electrostatic latent image on the charged photoconductor 31, a developing device 34 which develops the electrostatic latent image formed on the photoconductor 31 with each color component toner, a primary transfer device 35 which is provided on the back surface of the intermediate transfer body 40 facing the photoconductor 31 to primarily transfer the image on the photoconductor 31 to the intermediate transfer body 40, and a cleaning device 36 which cleans the toner remaining on the photoconductor 31 after the primary transfer are sequentially arranged around the photoconductor 31.

In this example, the latent image writing device 33 may be a device configured to separately write a latent image using, for example, an LED array with respect to each image forming unit 30, but is not limited thereto. A common laser scanning device which writes an electrostatic latent image of each color component with a corresponding laser beam may be provided for each image forming unit 30, or a laser scanning device may be provided separately. Reference numeral 38 (specifically, 38a to 38d) denotes a toner cartridge that supplies each color component toner to each developing device 34 of each of the image forming units 30 (30a to 30d).

Furthermore, in this example, the intermediate transfer body 40 is, for example, a belt-shaped member that extends around multiple tension rollers 41 to 44, and is driven to circulate and rotate in a predetermined direction using the tension roller 41 as a driving roller. The tension roller 43 serves as a tension imparting roller that applies a desired tension to the intermediate transfer body 40.

Reference numeral 45 denotes an intermediate transfer body cleaning device that cleans residues (for example, toner or paper dust) on the intermediate transfer body 40.

Furthermore, in this example, the batch transfer device 25 includes a transfer roller 25a which rotatably comes into contact with the surface of the intermediate transfer body 40 so as to be driven and rotated, the tension roller 42 of the intermediate transfer body 40 serves as a facing electrode. By creating a desired transfer electric field between the transfer roller 25a and the facing electrode, the images held on the intermediate transfer body 40 are collectively transferred onto the paper.

Further, a registration roller 28 is provided on the entrance side of the batch transfer device 25 in the paper transport path 24 to align the paper to be fed into the batch transfer device 25, and a discharge roller 29 is provided immediately before the paper discharge receptacle 27 in the paper transport path 24.

Process Cartridge

In the present exemplary embodiment, each image forming unit 30 is configured as a process cartridge 100 in which the photoconductor 31, the charging device 32, the developing device 34, and the cleaning device 36 are integrated, and is detachably mounted to a cartridge receptacle (not illustrated) of the apparatus case 21.

Figure 3:
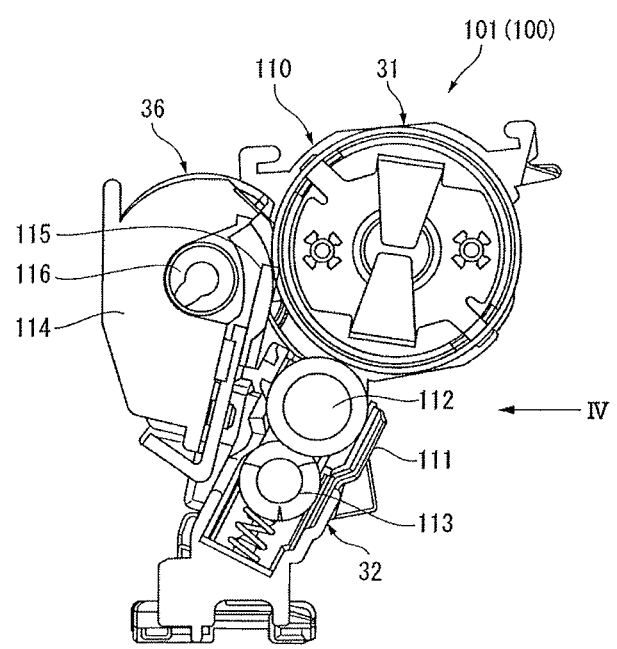
FIG. 3 is a view illustrating an example of a photoconductor cartridge of a process cartridge used in the first exemplary embodiment.

In particular, in this example, as illustrated in FIG. 3, the process cartridge 100 includes a photoconductor cartridge 101 in which the photoconductor 31 is mounted and a developing cartridge 102 which faces the photoconductor cartridge 101 and in which the developing device 34 is mounted. The photoconductor cartridge 101 and the developing cartridge 102 are attached to and detached from corresponding portions of the cartridge receptacle of the apparatus case 21.

Photoconductor Cartridge

Figure 4:
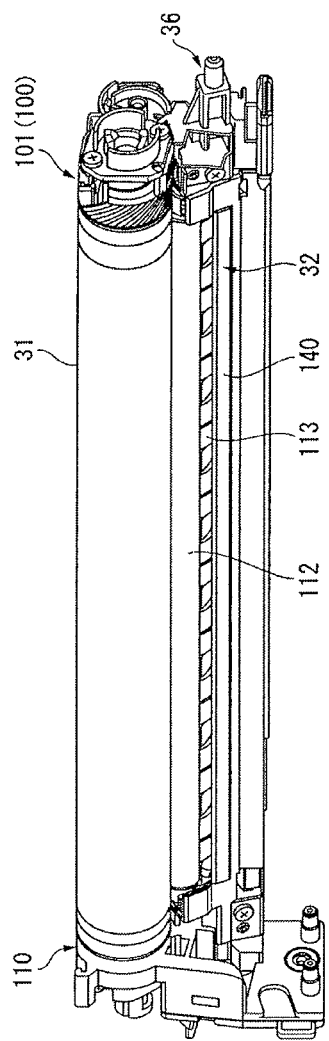
FIG. 4 is a view illustrating the photoconductor cartridge when viewed from the direction of the arrow IV in FIG. 3.

In this example, as illustrated in FIGS. 3 and 4, the photoconductor cartridge 101 includes an accommodating container 110 in which the photoconductor 31 is accommodated, and the charging device 32 and the cleaning device 36 are disposed around the photoconductor 31 in the accommodating container 110.

Here, both ends of a rotating shaft of the photoconductor 31 are rotatably supported by both ends of the accommodating container 110, and when the photoconductor 31 is mounted to the photoconductor cartridge 101, one end of the rotating shaft of the photoconductor 31 is connected to a driving mechanism (not illustrated).

Further, a charging container unit 111 is provided on a portion of the accommodating container 110, and the charging device 32 is mounted in the charging container portion 111 and includes a charging roller 112 which comes into contact with the surface of the photoconductor 31 and a cleaning roller 113 which cleans the charging roller 112.

Furthermore, a cleaning container unit 114 is provided on a portion of the accommodating container 110, and the cleaning device 36 is mounted in the cleaning container unit 114. A cleaning member 115 having a plate shape is provided on the opening edge of the cleaning container unit 114 to scrape off the toner remaining on the surface of the photoconductor 31, and a recovery transport member 116 (for example, having a form in which a spiral blade is attached around the rotating shaft) is disposed in the cleaning container unit 114 to transport the remaining toner scraped by the cleaning member 115 toward a recovery container (not illustrated).

Configuration Example of Charging Device

Figure 9:
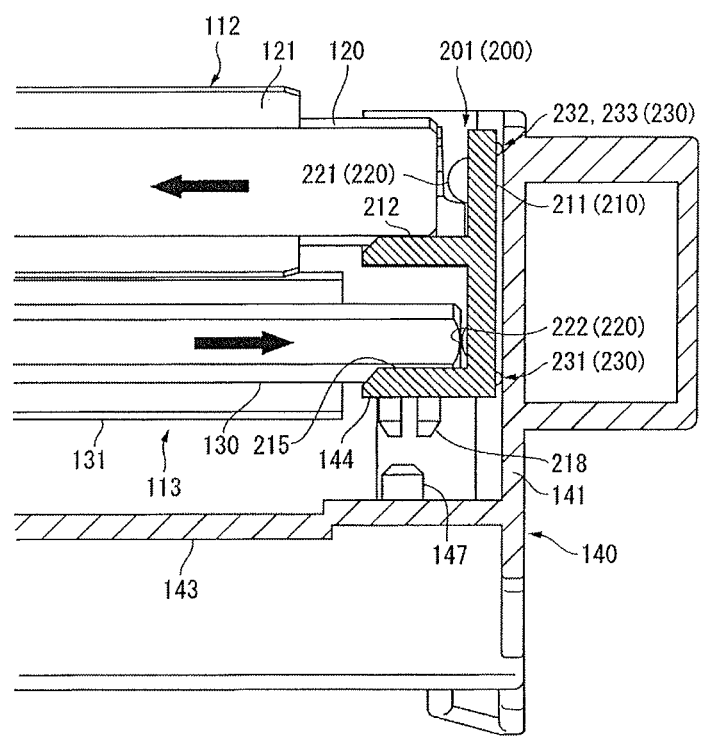
FIG. 9 is a view illustrating a support structure for a charging roller and a cleaning roller around the bearing component of the charging device illustrated in FIG. 6.

In the present exemplary embodiment, as illustrated in FIGS. 5A, 5B and 9, the charging device 32 includes the charging roller 112 which comes into contact with the photoconductor 31 and rotates following the photoconductor 31 to charge the photoconductor 31, the cleaning roller 113 which comes into contact with the charging roller 112 and rotates following the charging roller 112 to clean the charging roller 112, and a charging holder 140 as a holding unit which rotatably holds the charging roller 112 and the cleaning roller 113, and a pair of bearing components 200 (specifically 201 and 202) which rotatably receive rotating shafts located on both ends of the charging roller 112 and the cleaning roller 113 are provided on both longitudinal ends of the charging holder 140.

In this example, the charging roller 112 includes a rotating shaft 120 formed of a conductive metal, and a charging layer 121 is formed on a location excluding both ends of the rotating shaft 120.

The cleaning roller 113 includes a rotating shaft 130 formed of a conductive metal, and a spiral cleaning member 131 is formed by spirally winding a sponge material as a strip-shaped cleaning material around a location excluding both ends of the rotating shaft 130. In this example, the sponge material is appropriately selected from a foamed resin such as polyurethane, polyethylene, polyamide or polypropylene or a rubber.

Here, when the spiral cleaning member 131 of the cleaning roller 113 rotates in a predetermined direction, the frictional force caused when the cleaning roller 113 comes into contact with the charging roller 112 is applied in the driven-rotation direction and the axial direction by the angle formed by the spiral of the cleaning roller 113. Thus, the cleaning roller 113 moves to be biased toward, for example, one bearing component 201 (200). At this time, the charging roller 112 moves to be biased toward the other bearing component 202 (200) in the direction opposite to the cleaning roller 113.

Further, as illustrated in FIGS. 5A and 9, the charging holder 140 includes holding frames 141 and 142 which surround both ends of the charging roller 112 and the cleaning roller 113. The holding frames 141 and 142 are integrally connected to each other via a connection frame 143 formed of a long frame material. Pedestal units 144 on which the bearing components 200 (201 and 202) may be provided are formed in the vicinity of connection portion between the connection frame 143 and the holding frames 141 and 142 so that the bearing components 200 (201 and 202) are provided in the holding frames 141 and 142. Biasing springs 145 and 146 are interposed in a space between the connection frame 143 and bottom portions of the bearing components 200 (201 and 202) provided on the pedestal units 144, and the bearing components 200 (201 and 202) are biased toward the photoconductor 31 by the biasing springs 145 and 146.

Positioning pins 147 protrude from both ends of the connection frame 143, and the biasing springs 145 and 146 are positioned on the positioning pins 147.

Furthermore, in the present exemplary embodiment, any one bearing component 200 (202 in this example) is connected to a power supply terminal 150 via the biasing spring 146. By adding, for example, a power supply mechanism (not illustrated) to the bearing component 200, a predetermined charging voltage is applied to the charging roller 112. The power supply mechanism may be appropriately selected, for example, by separately adding a current path member or by forming a current path in advance in a portion of the bearing component 200.

Bearing Component

In this example, since the bearing components 200 (201 and 202) have substantially the same configuration, here, one bearing component 201 (200) will be described by way of example.

Figure 6:
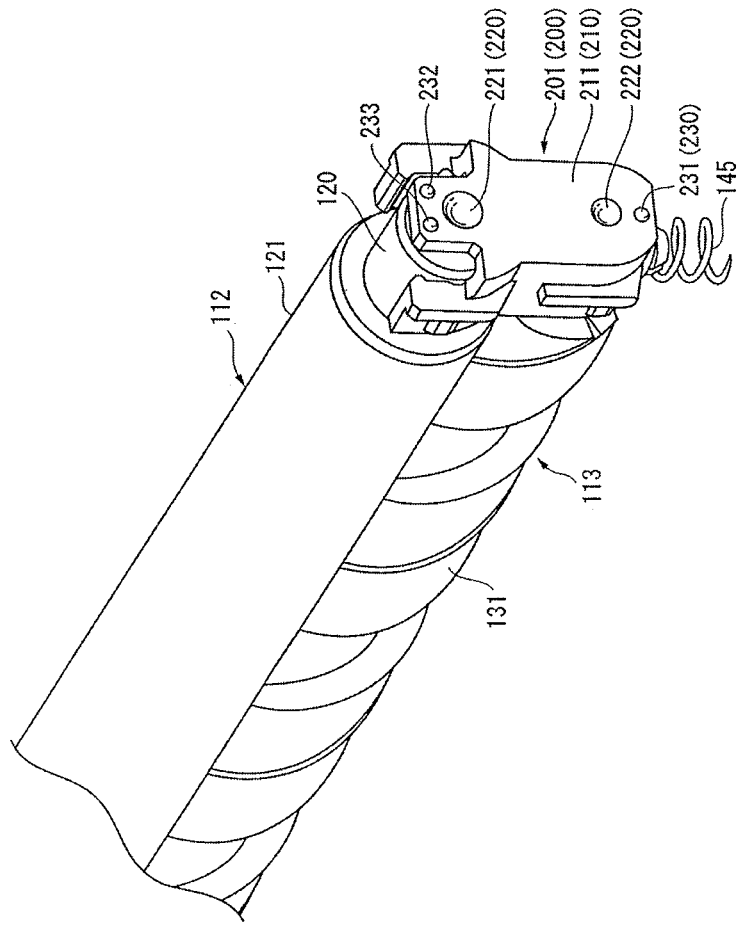
FIG. 6 is an enlarged view of the portion VI in FIG. 5B.
Figure 7:
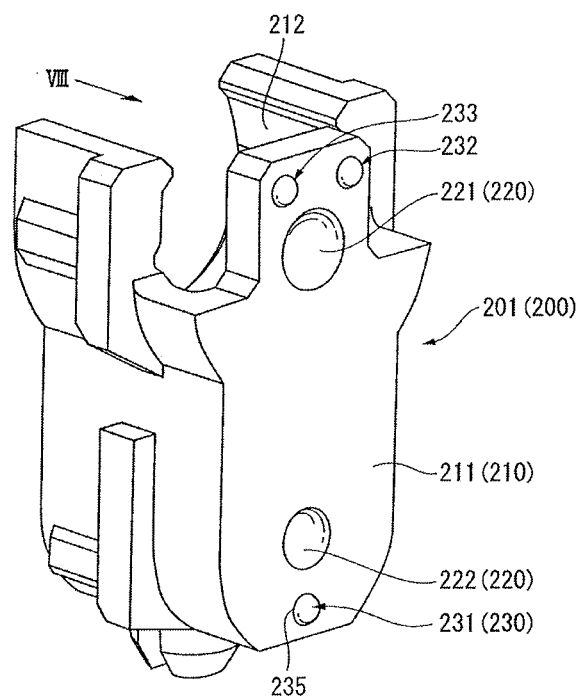
FIG. 7 is a view illustrating details of the bearing component illustrated in FIG. 6.
Figure 8:
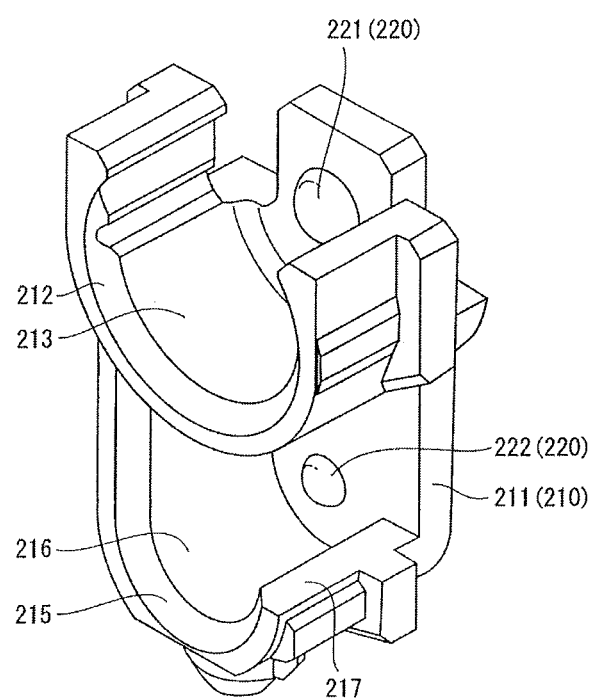
FIG. 8 is a view illustrating the bearing component illustrated in FIG. 7 when viewed from the direction of the arrow VIII.

In this example, as illustrated in FIGS. 6 to 8, the bearing component 201 (200) includes a component body 210 which rotatably supports the rotating shaft 120 located on the end of the charging roller 112 and the rotating shaft 130 located on the end of the cleaning roller 113.

Component Body

Here, the component body 210 is integrally molded from, for example, a synthetic resin such as POM, and includes a facing plate 211 disposed to face the end surfaces of the respective rotating shafts 120 and 130 of the charging roller 112 and the cleaning roller 113. A first recess 212 is integrally formed on the charging roller 112 side of the facing plate 211, and a second recess 215 is integrally formed on the cleaning roller 113 side of the facing plate 211.

In this example, the first recess 212 has a receiving portion 213 formed to have a substantially U-shaped cross-section with the facing plate 211 as a back surface portion, and rotatably receives the rotating shaft 120 located on the end of the charging roller 112. Further, the second recess 215 has a receiving portion 216 formed to have a substantially U-shaped cross-section with the facing plate 211 as a back surface portion, and rotatably receives the rotating shaft 130 located on the end of the cleaning roller 113. A cutout portion 217 is formed in a portion of the receiving portion 216, and the rotating shaft 130 located on the end of the cleaning roller 113 is movable inward or outward through the cutout portion 217.

In this example, a retaining pin 218 by which one end of the biasing spring 145 is caught is provided on the lower surface of the second recess 215 in the component body 210, and the bearing component 201 (200) is supported in a state of being biased by the biasing spring 145.

Inner Protrusion

Further, inner protrusions 220 (specifically, 221 and 222) are formed on the facing plate 211 which constitutes the back surfaces of the first recess 212 and the second recess 215, respectively.

In this example, the inner protrusions 220 (221 and 222) protrude from the surface of the facing plate 211 toward the end surfaces of the respective rotating shafts 120 and 130 located on the ends of the charging roller 112 and the cleaning roller 113, and are able to come into contact with the end surfaces of the respective rotating shafts 120 and 130.

Here, each of the inner protrusions 220 (221 and 222) has a curved surface portion 223 formed in a substantially hemispherical shape, but in this example, the inner protrusion 221 on the charging roller 112 side is selected to have a maximum outer diameter and to protrude from the facing plate 211 by a dimension greater than that of the inner protrusion 222 on the cleaning roller 113 side. A dimensional relationship of the inner protrusions 220 (221 and 222) may be appropriately changed in design based on the axial lengths of the charging roller 112 and the cleaning roller 113 or the outer diameter dimensions of the respective rotating shafts 120 and 130.

Outer Protrusion

Further, in the present exemplary embodiment, as illustrated in FIGS. 6 to 11, multiple (three in this example) outer protrusions 230 (specifically 231 to 233) are formed on the outer surface of the facing plate 211 of the component body 210 opposite to the first and second recesses 212 and 215 to protrude outward from the facing plate 211.

Here, each of the outer protrusions 230 (231 to 233) has a curved surface Portion 235 formed in a substantially hemispherical shape. In this example, the respective outer protrusions 230 (231 to 233) are set to protrude by the same dimension, and all of the outer protrusions are disposed so as to be able to come into contact with the holding frame 141 of the charging holder 140.

Figure 10:
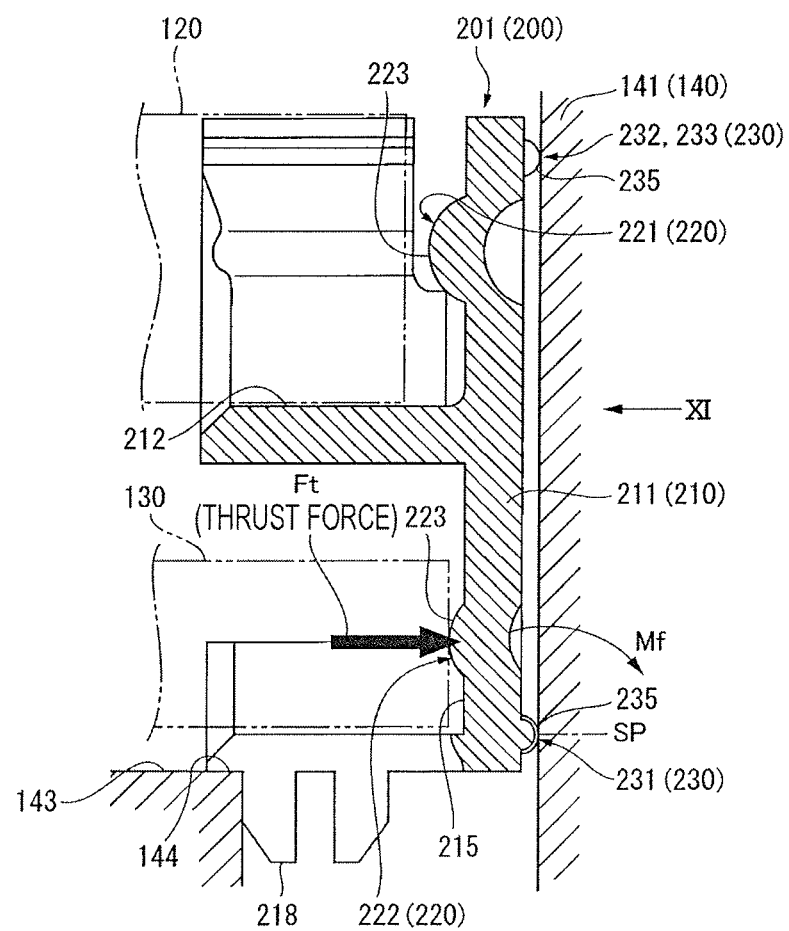
FIG. 10 is a view illustrating a load applied to the bearing component illustrated in FIG. 9 and a behavior of the bearing component caused by the load.
Figure 11:
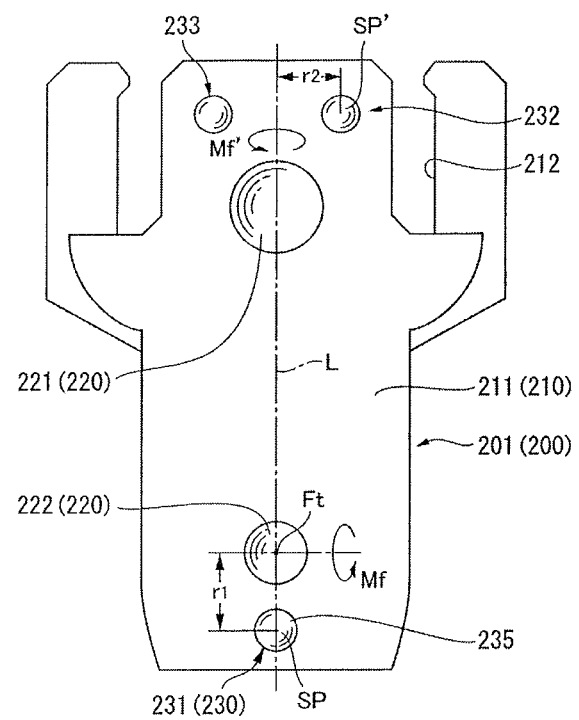
FIG. 11 is a view schematically illustrating a force applied to the bearing component when the bearing component of FIG. 10 is viewed from the direction of the arrow XI.

In particular, in this example, as illustrated in FIGS. 9 to 11, a contact portion between the respective outer protrusions 230 (231 to 233) and the holding frame 141 of the charging holder 140 is offset from the line of force of the axial load (thrust force Ft) which is exerted from the rotating shaft 130 of the cleaning roller 113 on the inner protrusion 222 (220) of the second recess 215. Then, the first outer protrusion 231 (230) is spaced apart from the point of application of the thrust force Ft (corresponding to the center position of the inner protrusion 222 (220)) by a distance r1 in the direction away from the photoconductor 31 (corresponding to the downward direction in FIGS. 9, 10 and 11). Further, the second outer protrusion 232 (230) is spaced apart from the point of application of the thrust force Ft to a position closer to the photoconductor 31 than the center position of the inner protrusion 221 (220) of the first recess 212 in an area opposite to the first outer protrusion 231, and the third outer protrusion 233 (230) is disposed at a line-symmetric position of the second outer protrusion 232 (230) with a reference line that interconnects the point of application of the thrust force Ft (the center position of the inner protrusion 222) and the center position of the inner protrusion 221 as a boundary.

Behavior of One Bearing Component

In the present exemplary embodiment, the charging roller 112 of the charging device 32 rotates following the photoconductor 31, and the cleaning roller 113 rotates following the charging roller 112. In this state, since the cleaning roller 113 includes the spiral cleaning member 131 around the rotating shaft 130, when the cleaning roller 113 rotates, a frictional force is generated between the charging roller 112 and the cleaning roller 113, and the cleaning roller 113 moves toward one bearing component 201 (200) by the frictional force.

For this reason, in the present exemplary embodiment, as illustrated in FIG. 10, the end surface of the rotating shaft 130 located on the end of the cleaning roller 113 collides with the inner protrusion 222 (220) in the second recess 215 of the bearing component 201 (200). Then, the axial load (corresponding to the thrust force Ft) exerted from the rotating shaft 130 of the cleaning roller 113 is applied to the inner protrusion 222 (220). In addition, since the charging roller 112 is moved in the direction opposite to the movement direction of the cleaning roller 113, the charging roller 112 does not collide with the inner protrusion 221 (220) in the first recess 212 of one bearing component 201 (200) and the axial load (thrust force) exerted from the rotating shaft 120 of the charging roller 112 is not substantially applied to the inner protrusion 221 (220) in the first recess 212.

At this time, the first outer protrusion 231 (230) is offset from the line of force of the thrust force Ft exerted on the inner protrusion 222 (220), and comes into point contact with the holding frame 141 of the charging holder 140. For this reason, the rotational moment Mf due to the thrust force Ft is applied to the bearing component 201 (200) with a contact portion between the first outer protrusion 231 (230) and the holding frame 141 as the fulcrum SP.

When the rotational moment Mf is applied, the component body 210 of the bearing component 201 (200) is pressed against the holding frame 141 of the charging holder 140, and accordingly, the second and third outer protrusions 232 and 233 (230) spaced apart from the first outer protrusion 231 (230) are pressed against the holding frame 141 of the charging holder 140. Thus, the component body 210 of the bearing component 201 (200) is held to be in contact with the holding frame 141 of the charging holder 140 via three outer protrusions 230 (231 to 233). For this reason, even if the end surface of the rotating shaft 120 located on the end of the charging roller 112 is not in contact with the inner protrusion 221 (220) in the first recess 212 of the bearing component 201 (200), the component body 210 of the bearing component 201 (200) does not fall down in the direction away from the holding frame 141, and the arrangement posture of the bearing component 201 (200) is maintained. Thus, there is substantially no risk that the rotating shafts 120 and 130 located on the ends of the charging roller 112 and the cleaning roller 113 come into single-side contact with the first recess 212 and the second recess 215 of the bearing component 201 (200).

Furthermore, in the present exemplary embodiment, when the thrust force Ft from the rotating shaft 130 of the cleaning roller 113 is applied to the inner protrusion 222 (220) in the second recess 215 of the bearing component 201 (200), as illustrated in FIG. 11, since a contact portion between the second outer protrusion 232 (230) and the holding frame 141 of the charging holder 140 is spaced apart from a reference line L that interconnects the first outer protrusion 231 (230) and the point of application of the thrust force Ft by a distance r2, a rotational moment Mf' due to the thrust force Ft is applied, for example, with a contact portion between the second outer protrusion 232 (230) and the holding frame 141 of the charging holder 140 as the fulcrum SP'. Since the rotational moment Mf' is applied in the direction crossing the rotational moment Mf described above, a phenomenon in which the component body 210 of the bearing component 201 (200) falls down in the direction away from the holding frame 141 is more reliably suppressed as compared with a case where there is no rotational moment Mf'.

Behavior of the Other Bearing Component

In the present exemplary embodiment, as illustrated in FIG. 5B, a basic configuration of the other bearing component 202 (200) is substantially the same as that of the bearing component 201 (200). A configuration in which a power supply mechanism (not illustrated) is added to the other bearing component 202 (200) and a charging voltage or a cleaning voltage is applied to the charging roller 112 or the cleaning roller 113 as needed from the power supply terminal 150 via the biasing spring 146 and the power supply mechanism is adopted.

Figure 12:
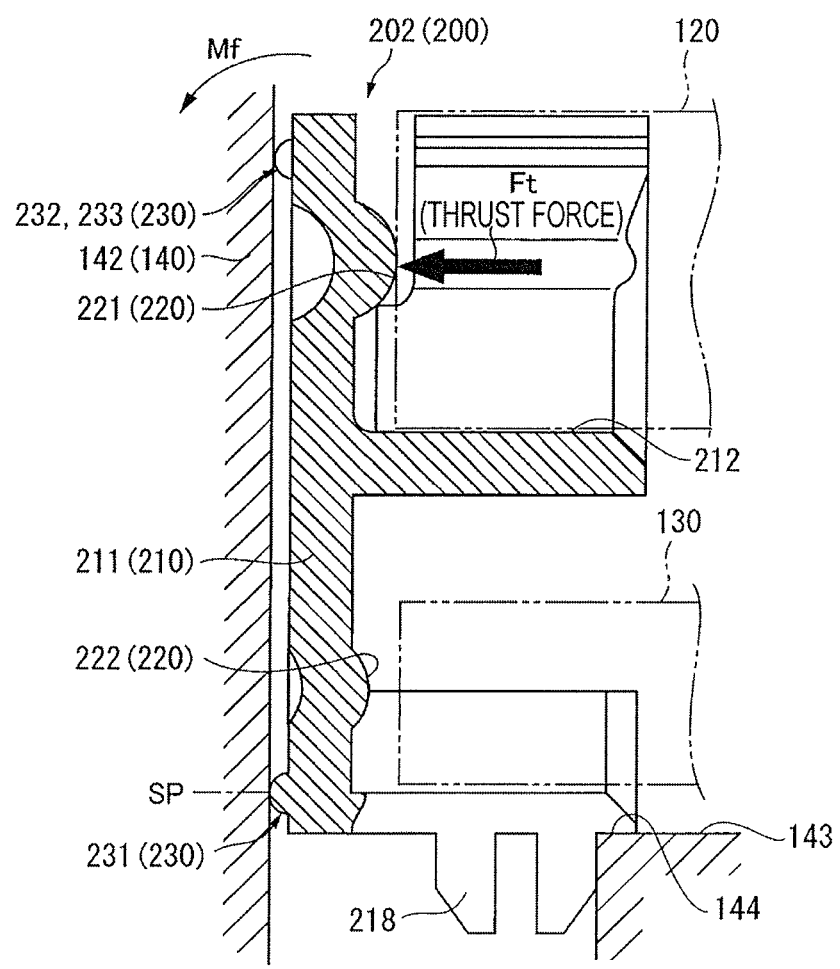
FIG. 12 is a view illustrating a load applied to the bearing component located at an opposite side to the bearing component illustrated in FIG. 9 and a behavior of the bearing component caused by the load.

In this example, as illustrated in FIG. 9, since the cleaning roller 113 is moved in a predetermined direction by the spiral cleaning member 131, the charging roller 112 tends to be moved in the axial direction opposite to the cleaning roller 113. At this time, considering a behavior of the other bearing component 202 (200), as illustrated in FIG. 12, the end surface of the rotating shaft 120 located on the end of the charging roller 112 collides with the inner protrusion 221 (220) in the first recess 212 of the bearing component 202 (200). Thus, the axial load (corresponding to the thrust force Ft) exerted from the rotating shaft 120 of the charging roller 112 is applied to the inner protrusion 221 (220). Since the cleaning roller 113 is moved in the direction opposite to the charging roller 112, the cleaning roller 113 hardly collides with the inner protrusion 222 (220) in the second recess 215 of the other bearing component 202 (200), and the axial load (thrust force) exerted from the rotating shaft 130 of the cleaning roller 113 is not applied to the inner protrusion 222 (220) in the second recess 215.

At this time, the first outer protrusion 231 (230) is offset from the line of force of the thrust force Ft exerted on the inner protrusion 221 (220) and comes into point contact with the holding frame 141 of the charging holder 140. For this reason, the rotational moment Mf due to the thrust force Ft is applied to the bearing component 202 (200) with a contact portion between the first outer protrusion 231 (230) and the holding frame 141 as the fulcrum SP.

When the rotational moment Mf is applied, the component body 210 of the bearing component 202 (200) is pressed against the holding frame 142 of the charging holder 140, and accordingly, the second and third outer protrusions 232 and 233 (230) spaced apart from the first outer protrusion 231 (230) are pressed against the holding frame 142 of the charging holder 140. Thus, the component body 210 of the bearing component 202 (200) is held to be in contact with the holding frame 142 of the charging holder 140 via three outer protrusions 230 (231 to 233). For this reason, the component body 210 of the bearing component 202 (200) does not fall down in the direction away from the holding frame 142, and the arrangement posture of the bearing component 202 (200) is maintained. Thus, there is substantially no risk that the rotating shafts 120 and 130 located on the ends of the charging roller 112 and the cleaning roller 113 come into single-side contact with the first recess 212 and the second recess 215 of the bearing component 201 (200).

First Modification

Figure 13:
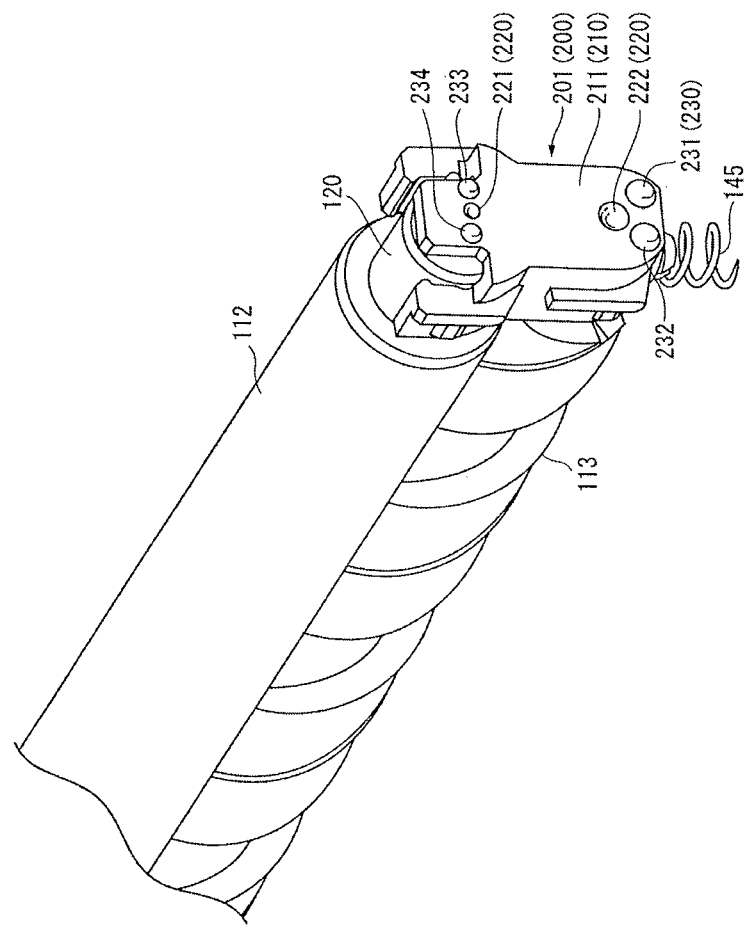
FIG. 13 is a view corresponding to FIG. 6, illustrating a major portion of a charging device using a bearing component according to a first modification.
Figure 14:
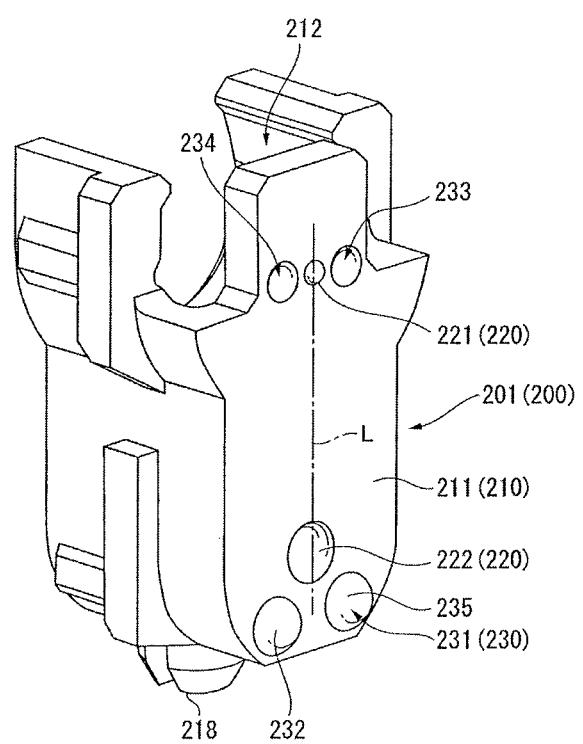
FIG. 14 is a view illustrating details of the bearing component illustrated in FIG. 13.
Figure 15:
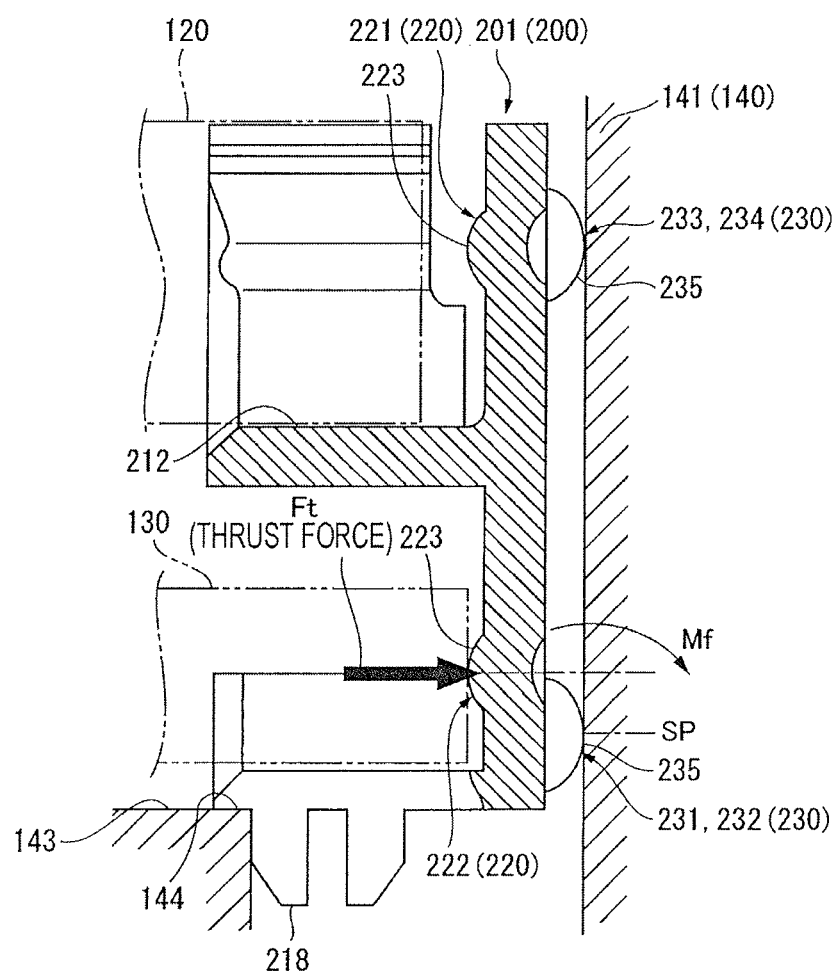
FIG. 15 is a view illustrating a load applied to the bearing component illustrated in FIG. 13 and a behavior of the bearing component caused by the load.

In the present exemplary embodiment, a layout of the outer protrusion 230 of the bearing component 200 (201 in this example) is not limited to that illustrated in the first exemplary embodiment, and for example, a configuration of a first modification illustrated in FIGS. 13 to 15 may be adopted.

In FIGS. 13 to 15, a basic configuration of the bearing component 200 (201) includes the component body 210 and the inner protrusions 220 (221 and 222) which are substantially the same as in the first exemplary embodiment, but the magnitudes of the inner protrusions 220 (221 and 222) are reversed from those of the first exemplary embodiment.

In this example, four outer protrusions 230 are formed, and each of the outer protrusions 230 (231 to 234) has the curved surface portion 235 formed in a substantially hemispherical shape. In this example, the dimensions by which the outer protrusions 230 (231 to 234) protrude are set to the same value, and all of the outer protrusions 230 (231 to 234) are disposed so as to able to come into contact with the holding frame 141 of the charging holder 140.

In particular, in this example, a contact portion between each of the outer protrusions 230 (231 to 234) and the holding frame 141 of the charging holder 140 is offset from the line of force of the axial load (thrust force Ft) exerted from the rotating shaft 130 of the cleaning roller 113 on the inner protrusion 222 (220) in the second recess 215. Then, the first and second outer protrusions 231 and 232 (230) are spaced apart from the point of application of the thrust force Ft (corresponding to the center position of the inner protrusion 222 (220)) in the direction away from the photoconductor 31 (corresponding to the downward direction in FIGS. 13 and 15), and are disposed symmetrically in the width direction crossing the reference line L with the reference line L (see FIG. 14) which extends to interconnect the point of application of the thrust force Ft and the center position of the inner protrusion 221 in the first recess 212 as a boundary. Further, the third and fourth outer protrusions 233 and 234 (230) are disposed at positions extending in the width direction from the center position of the inner protrusion 221 (220) of the first recess 212 with respect to the point of application of the thrust force Ft and, furthermore, at line-symmetrical positions with the reference line L as a boundary in an area opposite to the first and second outer protrusions 231 and 232 (230).

According to the present modification, in substantially the same manner as the first exemplary embodiment, the end surface of the rotating shaft 130 located on the end of the cleaning roller 113 collides with the inner protrusion 222 (220) in the second recess 215 of the bearing component 201 (200). Then, the axial load (corresponding to the thrust force Ft) exerted from the rotating shaft 130 of the cleaning roller 113 is applied to the inner protrusion 222 (220).

At this time, the first or second outer protrusion 231 or 232 (230) is offset from the line of force of the thrust force Ft exerted on the inner protrusion 222 (220), and comes into point contact with the holding frame 141 of the charging holder 140. For this reason, the rotational moment Mf due to the thrust force Ft is applied to the bearing component 201 (200) with a contact portion between the first or second outer protrusion 231 or 232 (230) and the holding frame 141 as the fulcrum SP.

When the rotational moment Mf is applied, the component body 210 of the bearing component 201 (200) is pressed against the holding frame 141 of the charging holder 140, and accordingly, the third or fourth outer protrusion 233 or 234 (230) spaced apart from the first or second outer protrusion 231 or 232 (230) is pressed against the holding frame 141 of the charging holder 140, so that the component body 210 of the bearing component 201 (200) is held to be in contact with the holding frame 141 of the charging holder 140 via at least three of the four outer protrusions 230 (231 to 234). For this reason, the component body 210 of the bearing component 201 (200) does not fall down in the direction away from the holding frame 141, and the arrangement posture of the bearing component 201 (200) is maintained. Thus, there is substantially no risk that the rotating shafts 120 and 130 located on the ends of the charging roller 112 and the cleaning roller 113 come into single-side contact with the first recess 212 and the second recess 215 of the bearing component 201 (200).

First Comparative Example

Figure 16:
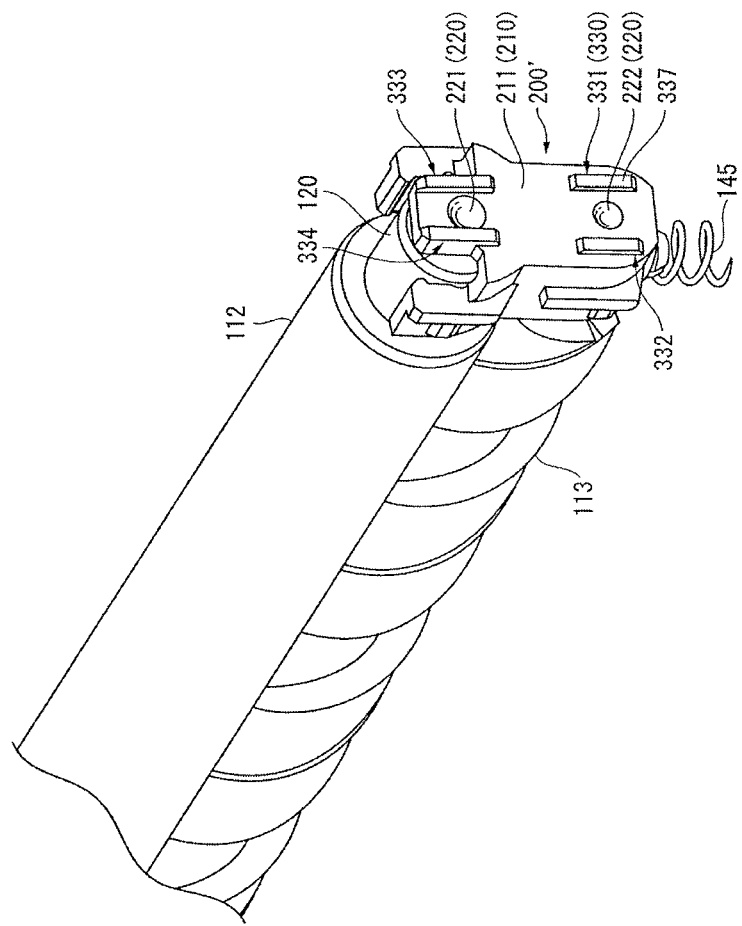
FIG. 16 is a view corresponding to FIG. 6, illustrating a major portion of a charging device using a bearing component according to a first comparative example.
Figure 17:
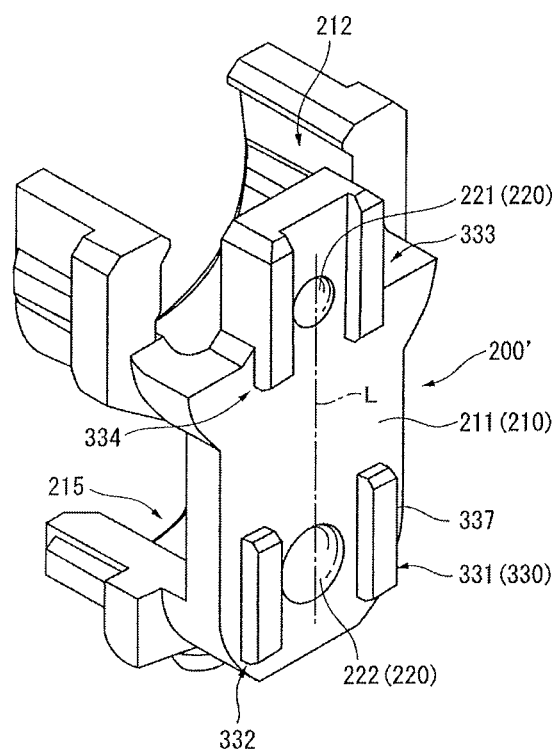
FIG. 17 is a view illustrating details of the bearing component illustrated in FIG. 16.
Figure 18:
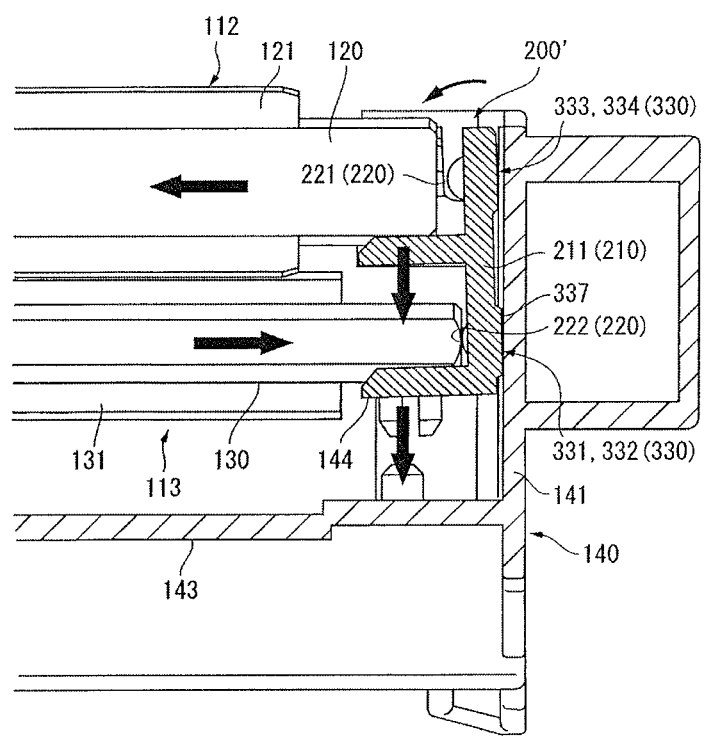
FIG. 18 is a view illustrating a support structure for a charging roller and a cleaning roller around the bearing component illustrated in FIG. 16.
Figure 19:
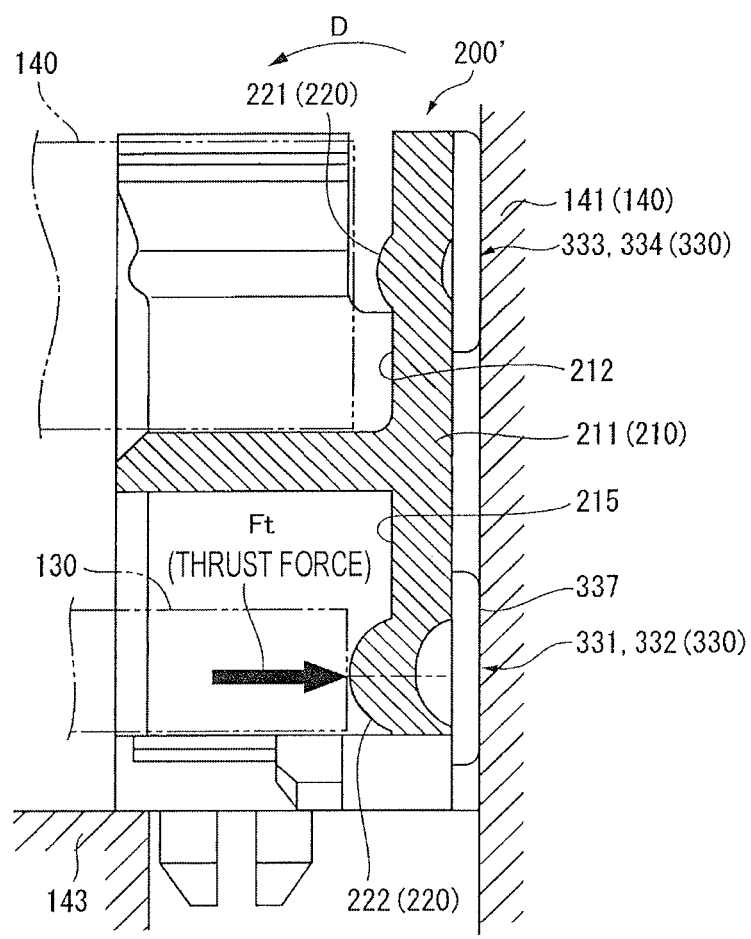
FIG. 19 is a view illustrating a load applied to the bearing component illustrated in FIG. 16 and a behavior of the bearing component caused by the load.

FIG. 16 is a view illustrating a major portion of a bearing component used in a charging device according to a first comparative example.

In FIG. 16, a basic configuration of the charging device 32 is substantially the same as that of the first exemplary embodiment, and a basic configuration of a bearing component 200' includes the component body 210 and the inner protrusions 220 (221 and 222) which are substantially the same as those of the first exemplary embodiment, but includes outer protrusions 330 (specifically, 331 to 334) different from those in the first exemplary embodiment. The same components as those in the first exemplary embodiment are denoted by the same reference numerals as those in the first exemplary embodiment, and a detailed description thereof is omitted here.

In this example, as illustrated in FIGS. 16 to 19, when a reference line which interconnects the center position of the inner protrusion 221 (220) in the first recess 212 of the bearing component 200' and the center position of the inner protrusion 222 (220) in the second recess 215 is denoted by L (see FIG. 17) and the direction perpendicular to the reference line L is defined as the width direction of the component body 210, a pair of the first and second outer protrusions 331 and 332 (330) are provided on both sides in the width direction of the component body 210 which passes through the center position of the inner protrusion 222 (220) in the second recess 215 of the bearing component 200' with the reference line L as a boundary, and all of the first and second outer protrusions 331 and 332 (330) are configured as planar extension portions 337 extending along the reference line L. Further, a pair of the third and fourth outer protrusions 333 and 334 (330) are provided on both sides in the width direction of the component body 210 which passes through the center position of the inner protrusion 221 (220) in the first recess 212 of the bearing component 200' with the reference line L as a boundary, and all of the third and fourth outer protrusions 333 and 334 (330) are configured as planar extension portions 337 extending along the reference line L.

According to the present comparative example, the end surface of the rotating shaft 130 located on the end of the cleaning roller 113 collides with the inner protrusion 222 (220) in the second recess 215 of the bearing component 200'. Then, the axial load (corresponding to the thrust force Ft) exerted from the rotating shaft 130 of the cleaning roller 113 is applied to the inner protrusion 222 (220).

At this time, since the first and second outer protrusions 331 and 332 (330) are configured as the planar extension portions 337, the first and second outer protrusions 331 and 332 (330) apply a reaction force to cancel the thrust force Ft from the holding frame 141 of the charging holder 140, and the first and second outer protrusions 331 and 332 (330) of the component body 210 of the bearing component 200' are held to be in contact with the holding frame 141 in a planar shape. For this reason, the rotational moment due to the thrust force Ft is not applied to the bearing component 200', and no force is applied to suppress the bearing component 200' from falling down D (see FIG. 19). For this reason, for example, when an external force is temporarily applied to the bearing component 200' in the direction away from the holding frame 141 of the charging holder 140, the bearing component 200' may fall down in the direction away from the holding frame 141, the charging roller 112 and the cleaning roller 113 may come into single-side contact with the first recess 212 and the second recess 215 due to a change in the posture of the bearing component 200', and poor image quality may occur due to a charging failure.

Meanwhile, in the bearing component 200' of this example, even when the end surface of the rotating shaft 120 located on the end of the charging roller 112 collides with the inner protrusion 221 (220) in the first recess 212, the thrust force Ft applied to the inner protrusion 221 (220) is received as a reaction force by the planar extension portions 337 formed by the third and fourth outer protrusions 333 and 334 (330). The rotational moment due to the thrust force Ft is not applied to press the bearing component 200' against the holding frame 141 of the charging holder 140.

Second Comparative Example

Figure 20:
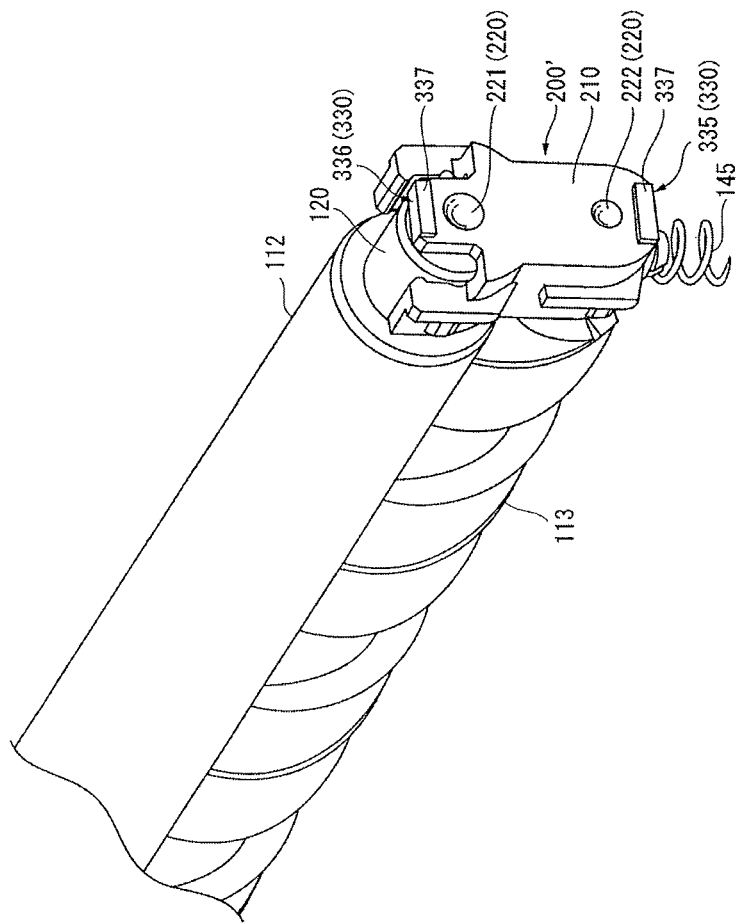
FIG. 20 is a view corresponding to FIG. 6, illustrating a major portion of a charging device using a bearing component according to a second comparative example.

FIG. 20 is a view illustrating a major portion of a bearing component used in a charging device according to a second comparative example.

In FIG. 20, a basic configuration of the charging device 32 is substantially the same as that of the first exemplary embodiment. A basic configuration of a bearing component 200' includes the component body 210 and the inner protrusions 220 (221 and 222) which are substantially the same as those in the first exemplary embodiment, but includes outer protrusions 330 (specifically, 335 and 336) different from those in the first exemplary embodiment. The same components as those in the first exemplary embodiment are denoted by the same reference numerals as those in the first exemplary embodiment, and a detailed description thereof is omitted here.

Figure 21:
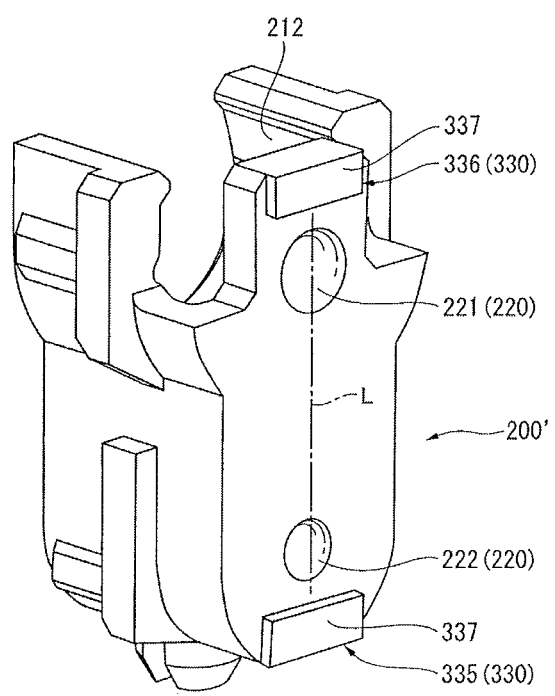
FIG. 21 is a view illustrating details of the bearing component illustrated in FIG. 20.
Figure 22:
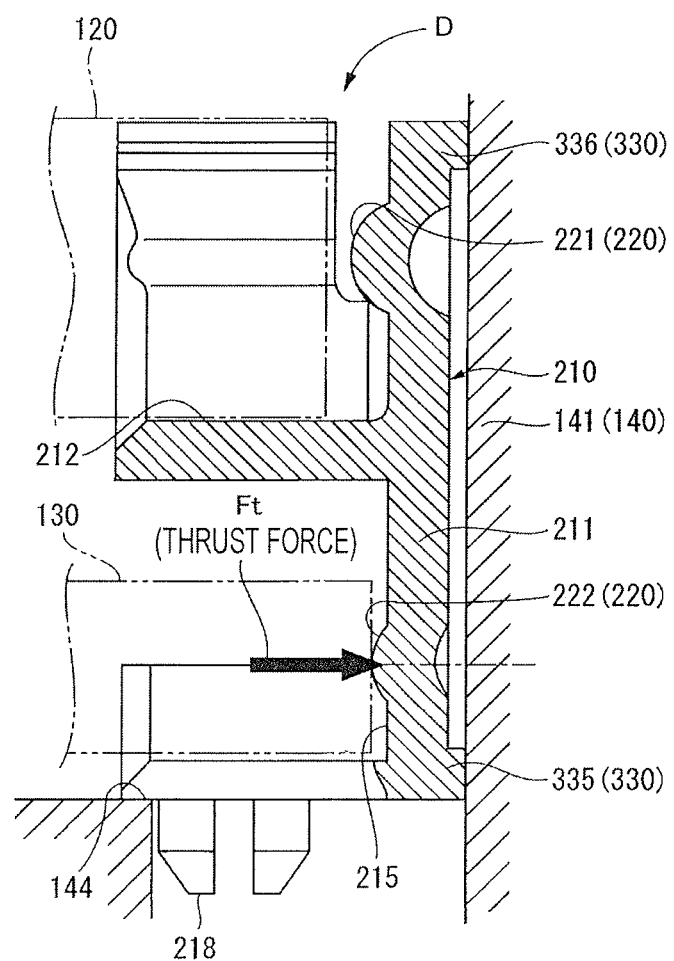
FIG. 22 is a view illustrating a load applied to the bearing component illustrated in FIG. 20 and a behavior of the bearing component caused by the load.

In this example, as illustrated in FIGS. 20 to 22, when a reference line which interconnects the center position of the inner protrusion 221 (220) in the first recess 212 of the bearing component 200' and the center position of the inner protrusion 222 (220) in the second recess 215 is denoted by L (see FIG. 21) and the direction perpendicular to the reference line L is defined as the width direction of the component body 210, the first outer protrusion 335 (330) is configured as the planar extension portion 337 which is provided along the reference line L at the lower side of the center position of the inner protrusion 222 (220) in the second recess 215 of the bearing component 200' and extends along the width direction of the component body 210. Further, the second outer protrusion 336 (330) is configured as the planar extension portion 337 which is provided along the reference line L at the upper side of the center position of the inner protrusion 221 (220) in the first recess 212 of the bearing component 200' and extends along the width direction of the component body 210.

According to the present comparative example, the end surface of the rotating shaft 130 located on the end of the cleaning roller 113 collides with the inner protrusion 222 (220) in the second recess 215 of the bearing component 200'. Then, the axial load (corresponding to the thrust force Ft) exerted from the rotating shaft 130 of the cleaning roller 113 is applied to the inner protrusion 222 (220).

At this time, since the first and second outer protrusions 335 and 336 (330) are configured as the planar extension portions 337, the first and second outer protrusions 335 and 336 (330) apply a reaction force to cancel the thrust force Ft from the holding frame 141 of the charging holder 140, and the first and second outer protrusions 335 and 336 (330) of the component body 210 of the bearing component 200' are held to be in contact with the holding frame 141 in a planar shape. For this reason, the rotational moment due to the thrust force Ft is not applied to the bearing component 200', and no force is applied to suppress the bearing component 200' from falling down D (see FIG. 22). For this reason, for example, when an external force is temporarily applied to the bearing component 200' in the direction away from the holding frame 141 of the charging holder 140, the bearing component 200' may fall down in the direction away from the holding frame 141, the charging roller 112 and the cleaning roller 113 may come into single-side contact with the first recess 212 and the second recess 215 due to a change in the posture of the bearing component 200', and poor image quality may occur due to a charging failure.

Meanwhile, in the bearing component 200' of this example, even when the end surface of the rotating shaft 120 located on the end of the charging roller 112 collides with the inner protrusion 221 (220) in the first recess 212, since the thrust force Ft applied to the inner protrusion 221 (220) is received as a reaction force by the planar extension portions 337 formed by the first and second outer protrusions 335 and 336 (330), the rotational moment due to the thrust force Ft is not applied to press the bearing component 200' against the holding frame 141 of the charging holder 140.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A bearing component for rotatably receiving a rotating shaft located on an end of a rotating unit, the bearing component comprising:
   a component body having a recess into which the rotating shaft is rotatably inserted;
   an inner protrusion that protrudes from a wall portion of the recess facing an end surface of the rotating shaft, the inner protrusion being configured to receive an axial load exerted by the rotating shaft with being in contact with the end surface of the rotating shaft; and
   one or more outer protrusions that protrude from an outer surface of the component body opposite to the recess, the one or more outer protrusions being configured to come into contact with a holding unit configured to hold the component body, wherein
   a contact portion between the one or more outer protrusions and the holding unit is offset from a contact portion position between the inner protrusion and the end surface of the rotating shaft, and
   at least one of the one or more outer protrusions on the outer surface of the component body is formed such that the contact portion between the at least one of the one or more outer protrusions and the holding unit has a non-planar shape, and the component body comprises a portion to be held to be in contact with the holding unit in an area that lies outside, in a radial direction of the rotating unit, from the contact portion position of the inner protrusion.

2. The bearing component according to claim 1, wherein a portion of each outer protrusion to come in contact with the holding unit has a curved surface.

3. The bearing component according to claim 1, wherein a portion of the inner protrusion to come into contact with the end surface of the rotating shaft of the rotating unit has a curved surface.

4. The bearing component according to claim 1, wherein the component body has a plurality of the recess into which a plurality of the rotating shaft located at the ends of the rotating unit are rotatably inserted.

5. The bearing component according to claim 4, wherein the one or more outer protrusions are positioned with respect to the inner protrusion in the recess to maintain contact with the holding unit when the axial load exerted by the rotating shaft is applied.

6. The bearing component according to claim 4, wherein the number of the one or more outer protrusions are larger than the number of the inner protrusion.

7. The bearing component according to claim 4, wherein
   the one or more outer protrusions comprise a plurality of the outer protrusions, and
   the rotational moments due to the axial load exerted by the rotating shaft on the inner protrusion in the recess are applied in different directions.

8. A rotating device comprising:
the bearing component according to claim 1;
the rotating unit having the rotating shaft on the end thereof, the bearing component rotatably receiving the rotating shaft of the rotating unit; and
the holding unit that holds the bearing component.

9. The rotating device according to claim 8, wherein the rotating unit comprises a charging unit configured to charge a contact target unit with being in contact with the contact target unit.

10. The rotating device according to claim 9, wherein the bearing component comprises a power supply element added to the component body.

11. The rotating device according to claim 8, wherein the rotating unit comes into contact with a contact target unit that is driven and rotated, and rotates following the contact target unit.

12. An image forming apparatus comprising:
an image carrier configured to carry an image; and
the rotating device according to claim 8 comprising the rotating unit in contact with the image carrier.

13. The image forming apparatus according to claim 12, wherein
the rotating device comprises
a charging unit configured to charge the image carrier, come into contact with the image carrier, and rotate following the image carrier to charge the image carrier, and
a cleaning unit configured to come into contact with the charging unit and rotate following the charging unit to clean the charging unit,
the cleaning unit comprises a cleaning member spirally provided around the rotating shaft, and
the cleaning member is movable in one axial direction when rotating following the rotation of the charging unit.

14. A bearing component for rotatably receiving a rotating shaft located on an end of a rotating unit, the bearing component comprising:
a component body having a recess into which the rotating shaft is rotatably inserted;
an inner protrusion that protrudes from a wall portion of the recess facing an end surface of the rotating shaft, the inner protrusion being configured to receive an axial load exerted by the rotating shaft with being in contact with the end surface of the rotating shaft; and
one or more outer protrusions that protrude from an outer surface of the component body opposite to the recess, the one or more outer protrusions being configured to come into contact with a holding unit configured to hold the component body, wherein
a contact portion between the one or more outer protrusions and the holding unit is offset from a line of force of an axial load exerted by the rotating shaft on the inner protrusion, and
at least one of the one or more outer protrusions acts as a fulcrum at which a rotational moment due to the axial load exerted by the rotating shaft is applied in a direction of maintaining a posture of the component body with respect to the holding unit.

15. The bearing component according to claim 14, wherein a portion of each outer protrusion to come in contact with the holding unit has a curved surface.

16. The bearing component according to claim 14, wherein a portion of the inner protrusion to come into contact with the end surface of the rotating shaft of the rotating unit has a curved surface.

17. The bearing component according to claim 14, wherein the component body has a plurality of the recess into which a plurality of the rotating shaft located at the ends of the rotating unit are rotatably inserted.

18. The bearing component according to claim 17, wherein the one or more outer protrusions are positioned with respect to the inner protrusion in the recess to maintain contact with the holding unit when the axial load exerted by the rotating shaft is applied.

19. The bearing component according to claim 17, wherein the number of the one or more outer protrusions are larger than the number of the inner protrusion.

20. A rotating device comprising:
the bearing component according to claim 14;
the rotating unit having the rotating shaft on the end thereof, the bearing component rotatably receiving the rotating shaft of the rotating unit; and
the holding unit that holds the bearing component.

* * * * *